(12) United States Patent
Takama et al.

(10) Patent No.: US 8,325,298 B2
(45) Date of Patent: Dec. 4, 2012

(54) DISPLAY APPARATUS WITH LIGHT DETECTION AND FABRICATION METHOD FOR DISPLAY APPARATUS WITH LIGHT DETECTION

(75) Inventors: Daisuke Takama, Kanagawa (JP);
Mitsuru Tateuchi, Kanagawa (JP);
Tsutomu Harada, Kanagawa (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 12/523,929

(22) PCT Filed: Nov. 13, 2008

(86) PCT No.: PCT/JP2008/070659
§ 371 (c)(1),
(2), (4) Date: Jul. 21, 2009

(87) PCT Pub. No.: WO2009/069471
PCT Pub. Date: Jun. 4, 2009

(65) Prior Publication Data
US 2010/0220269 A1   Sep. 2, 2010

(30) Foreign Application Priority Data
Nov. 28, 2007 (JP) .................................. 2007-306896

(51) Int. Cl.
*G02F 1/1335* (2006.01)
(52) U.S. Cl. .............................. 349/106; 349/110; 430/7
(58) Field of Classification Search .......... 349/106–110; 430/7
See application file for complete search history.

(56) References Cited

U.S. PATENT DOCUMENTS

| 2007/0268206 A1* | 11/2007 | Kinoshita et al. ............... 345/30 |
| 2008/0278665 A1* | 11/2008 | Uemoto ......................... 349/106 |
| 2011/0181948 A1* | 7/2011 | Kindler et al. ................. 359/454 |

FOREIGN PATENT DOCUMENTS

| JP | 08-028206 | 1/1996 |
| JP | 2005-275644 | 10/2005 |
| JP | 2007-140106 | 6/2007 |

OTHER PUBLICATIONS

International Search Report dated Feb. 10, 2009.

* cited by examiner

Primary Examiner — Huyen Ngo
(74) Attorney, Agent, or Firm — SNR Denton US LLP

(57) ABSTRACT

A display apparatus is provided which can detect light of a predetermined wavelength with a high degree of accuracy from within light incident from a screen by a simple configuration. The display apparatus includes a CF substrate (9) having a plurality of color filters (31) of different colors for passing light for displaying an image on the screen (55a) and an IR filter (33) provided in a region different from an arrangement region of the color filters of the different colors for passing light incident from the screen (55a), and a main sensor (19) provided on the rear side of the IR filter (33) for detecting light incident from the screen (55a) and passing through the IR filter (33). The IR filter (33) has a laminate of filter materials same as filter materials from which at least two or more ones of the color filters of the different colors are formed respectively.

6 Claims, 13 Drawing Sheets

DISPLAY APPARATUS WITH LIGHT DETECTION AND FABRICATION METHOD FOR DISPLAY APPARATUS WITH LIGHT DETECTION

TECHNICAL FIELD

This invention relates to a display apparatus capable of detecting light incident from a screen and a fabrication method for the display apparatus.

BACKGROUND ART

A display apparatus is known which selectively detects light of a particular wavelength from within light incident thereto. For example, a liquid crystal display apparatus of Japanese Patent Laid-Open No. 2005-275644 is a display apparatus of the so-called touch sensor type and detects infrared rays emitted from a backlight and reflected by a detection object such as a finger of a user positioned in the proximity of a screen by means of a plurality of optical sensors disposed for individual pixels to detect proximity and contact of the detection object to and with the screen. While light of various wavelengths is included in light incident from the screen, since the transmission factor of infrared rays through a liquid crystal panel is higher than that of visible rays, only the infrared rays can be selectively detected by the optical sensors provided behind the liquid crystal panel. According to the technique of Japanese Patent Laid-Open No. 2005-275644, an IR filter which passes only infrared rays therethrough is provided between the optical sensors and the screen to enhance the accuracy in selective detection of infrared rays from within light incident from the screen.

DISCLOSURE OF INVENTION

Japanese Patent Laid-Open No. 2005-275644 does not refer to a material or a formation method of the IR filter. Since the technique of Japanese Patent Laid-Open No. 2005-275644 includes an IR filter, it gives rise to increase of the number of kinds of materials and increase of the number of fabrication steps and hence gives rise to increase of the fabrication cost.

The object of the present invention resides in provision of a display apparatus which can detect light of a predetermined wavelength with a high degree of accuracy from within light incident from a screen in a simplified configuration and a fabrication method for the display apparatus.

According to the present invention, a display apparatus includes color filters of different colors for passing light for displaying an image on a screen therethrough and a detection filter for passing light incident thereto from the screen therethrough, and an optical sensor for detecting light incident from the screen through the detection filter, at least two or more ones of the color filters of the different colors having spectral characteristics that transmission factors thereof are higher in particular wavelength regions which are different among the color filters of the different colors within a first wavelength region and the transmission factors are higher also in a second wavelength region different from the first wavelength region, the detection filter being formed from a laminate of filter materials same as filter materials from which at least the two or more ones of the color filters of the different colors are formed.

Preferably, the detection filter is provided in a region different from arrangement regions of the color filters of the different colors on a color filter substrate on which the color filters of the different colors are provided.

Preferably, the first wavelength region is a wavelength region of visible rays, and the second wavelength region is a wavelength region of invisible rays.

Preferably, the color filters of the different colors are provided for three or more colors, and the detection filter has a laminate only of filter materials same as filter materials from which the color filters of two colors are formed.

Preferably, the detection filter has a laminate of all of filter materials same as filter materials from which the color filters of the different colors are formed.

Preferably, the detection filter has sides contiguous, as viewed in plan, to sides of the color filters of two or more of the different colors formed from filter materials same as filter materials which the detection filter has.

Preferably, a plurality of layers of the filter material of one of the colors formed long in a predetermined direction as viewed in plan are arrayed in a direction perpendicular to the predetermined direction while a plurality of layers of the filter material of a different one of the different colors formed long in the direction perpendicular to the predetermined direction as viewed in plan are arrayed in the predetermined direction, and the color filters are formed from portions of the layer of the filter material of the one color and the layer of the filter material of the different color which do not overlap with each other while the detection filter is formed from portions of the two layers which overlap with each other.

Preferably, the color filter substrate has a light blocking portion, and a noise removing sensor capable of detecting light is provided behind the light blocking portion, the display apparatus further including a mathematical operation section for subtracting a correction value based on a detection value of the noise removing sensor from a detection value of the optical sensor.

According to the present invention, a fabrication method for a display apparatus capable of detecting light incident from a screen includes a first step of forming a layer of a filter material of a first color which exhibits a higher transmission factor of light in a third wavelength region within a first wavelength region and a second wavelength region different from the first wavelength region, and a second step of forming a layer of a filter material of a second color which exhibits a higher transmission factor of light in a fourth wavelength region different from the third wavelength region within the first wavelength region and in the second wavelength region such that the layer overlaps at a portion but does not overlap at another portion thereof with the layer of the filter material of the first color.

Preferably, at the first and second steps, the layers of the filter materials of the first and second colors are formed by photolithography.

According to the present invention, light of a predetermined wavelength can be detected with a high degree of accuracy from within light incident from the screen by a simple configuration.

BEST MODE FOR CARRYING OUT THE INVENTION

First Embodiment

Figure 1:
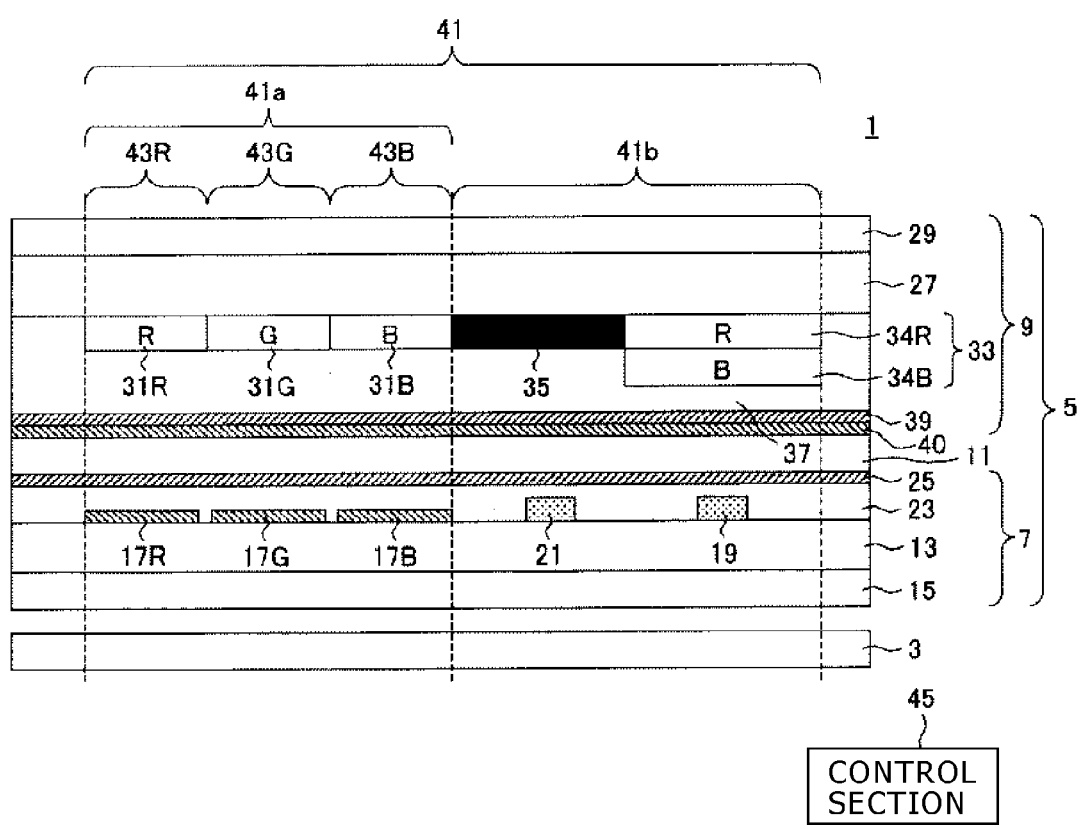
FIG. 1 is a sectional view schematically showing a general configuration of a liquid crystal display apparatus according to a first embodiment of the present invention.

FIG. 1 is a sectional view schematically showing a general configuration of a liquid crystal display apparatus 1 according to a first embodiment of the present invention.

In the liquid crystal display apparatus 1, a plurality of pixels 41 are arrayed in rows and columns as viewed in plan (as viewed from above the plane of FIG. 1). It is to be noted that, in FIG. 1, a sectional view of a pixel 41 among the plurality of pixels 41 is shown. For the plural pixels 41, a display region 41a for displaying an image on a screen 55a (refer to FIG. 4) and a detection region 41b for detecting light incident from the screen 55a are provided. In the display region 41a, a plurality of subpixels 43R, 43G and 43B are provided corresponding to a plurality of colors (wavelength regions of a plurality of kinds of light). The subpixels 43R, 43G and 43B correspond, for example, to red (R), green (G) and blue (B).

It is to be noted that, in the following description, R, G and B are added to reference characters of components corresponding to red (R), green (G) and blue (B), and R, G and B may suitably be omitted (for example, merely the term "subpixel 43" may be used).

First, a configuration relating to display of an image on the liquid crystal display apparatus 1 is described.

The liquid crystal display apparatus 1 is formed, for example, from a liquid crystal display apparatus of the transmission type or the semi-transmission type, and has a backlight 3 and a display panel 5 which passes light from the backlight 3 therethrough to display an image. It is to be noted that the display panel 5 is normally covered with a protective cover 55 (refer to FIG. 4) for protecting the display panel 5 from a load, dust and so forth.

The backlight 3 functions generally as an area light source and irradiates light (for example, white light) including various wavelengths upon the display panel 5. It is to be noted that the backlight 3 may be of the so-called direct type or of the side light type.

The display panel 5 has an array substrate 7 and a color filter substrate (CF substrate) 9 disposed in an opposing relationship to each other, and liquid crystal 11 filled in a gap between the array substrate 7 and the CF substrate 9. The display panel 5 is disposed in an opposing relationship to the backlight 3 such that the array substrate 7 is positioned on the backlight 3 side and the CF substrate 9 is positioned on the opposite side to the backlight 3.

The array substrate 7 has an incidence side glass substrate 13 as a substrate. Various members are provided in a laminated state in the incidence side glass substrate 13. In particular, an incidence side polarizing plate 15 for converting light into polarized light is adhered to a face of the incidence side glass substrate 13 adjacent the backlight 3. Further, pixel electrodes 17R, 17G and 17B provided for the individual subpixels 43 for applying a voltage to the liquid crystal 11, an incidence side flattening film 23 for flattening unevenness by the pixel electrodes 17 and so forth and an incidence side orientation film 25 for orienting the liquid crystal 11 are laminated in order from the lower side of the plane of the figure to the upper side of the plane of the figure on the face of the incidence side glass substrate 13 adjacent the liquid crystal 11.

It is to be noted that, although data electrodes (generally sometimes called X electrodes, data signal lines or source signal lines), TFT elements which function as switching elements for driving the liquid crystal, capacitors as signal holding capacitors for active matrix operation and so forth are provided on the array substrate 7, they are omitted in the figure. Further, a protective film, an insulating film or the like may be provided at a suitable position on the array substrate 7.

The CF substrate 9 has an emergence side glass substrate 27 as a substrate. Various kinds of members are provided in a laminated manner on the emergence side glass substrate 27. In particular, on the face of the emergence side glass substrate 27 opposite to the liquid crystal 11, an emergence side polarizing plate 29 for converting light into polarized light is adhered. Meanwhile, on the face of the emergence side glass substrate 27 adjacent the liquid crystal 11, color filters 31R, 31G and 31B provided for the individual subpixels 43, an emergence side flattening film 37 for flattening unevenness by the color filters 31 and so forth, a common electrode 39 provided commonly to the plural subpixels 43 for applying a voltage to the liquid crystal 11 and an emergence side orientation film 40 for orienting the liquid crystal 11 are laminated in order from the upper side of the plane of the figure to the lower side of the plane of the figure on the face of the emergence side glass substrate 27 adjacent the liquid crystal 11.

Each color filter 31 passes visible rays in a predetermined frequency region (light of a predetermined color) therethrough while it absorbs visible rays in any other frequency. In particular, for example, by the Commission International de l'Eclairrage (CIE), it is defined that the wavelength of monochromatic light of red is 700 nm, the wavelength of monochromatic light of green is 546.1 nm, and the wavelength of monochromatic light of blue is 435.8 nm, and the color filters 31R, 31G and 31B are configured such that each of them exhibits a higher transmission factor (which is basically grasped as a relative magnitude of the transmission factor at each wavelength, but is, as an absolute magnitude, by more than 60%) within a frequency region including or proximate to the wavelength specified above (for example, within a range of a magnitude of approximately 50 to 120 nm). The color filters 31 may be of the type formed using pigments or using dyestuffs.

An action for display of the liquid crystal display apparatus 1 having the configuration described above is such as described below. In each subpixel 43, if a voltage is applied to the pixel electrode 17 and the common electrode 39, then the liquid crystal 11 is oriented at an angle corresponding to the applied voltage to a direction different from the direction defined by the incidence side orientation film 25 and the emergence side orientation film 40. Consequently, the angle by which polarized light advancing from the incidence side polarizing plate 15 to the emergence side polarizing plate 29 is optically rotated is controlled, and hence the amount of light to be emitted from the subpixel 43 is adjusted. Then, each color filter 31 passes only light in a predetermined wavelength region (color) from within visible rays, and the balance among the amounts of light of the colors is adjusted to carry out color display.

Now, a configuration relating to detection of light incident from the screen of the liquid crystal display apparatus 1 is described.

In the detection region 41b, a main sensor 19 for detecting light incident from the screen and a noise removing sensor 21 for estimating noise included in a signal from the main sensor 19 are provided in the array substrate 7 in place of the pixel electrodes 17 in comparison with the display region 41a.

The main sensor 19 outputs an electric signal corresponding to the amount of received light and is formed including a PIN photodiode or a PDN photodiode formed using, for example, a-Si or u-Si. The noise removing sensor 21 is different only in the arrangement position from the main sensor 19 but has a similar configuration.

Further, in the detection region 41b, an IR filter 33 for passing light of an object of detection of the main sensor 19 from within light incident from the screen therethrough and a light blocking portion 35 for blocking light so that the light incident from the screen may not reach the noise removing sensor 21 are provided on the CF substrate 9 in place of the color filters 31 in comparison with the display region 41a.

The lights of the objects of detection of the main sensor 19 are, for example, infrared rays, and the IR filter 33 is configured such that it passes infrared rays therethrough but absorbs the other light (visible rays and so forth). The IR filter 33 is configured by laminating materials same as materials (color materials) which form two kinds of the color filters 31. For example, the IR filter 33 has a laminate of a filter composition layer 34R formed from a material same as that of the color filter 31R and a filter composition layer 34B formed from a material same as that of the color filter 31B. The thickness of each filter composition layer 34 is same as that of the color filter 31, and the IR filter 33 having the two filter composition layers 34 has a thickness equal to twice that of the color filter 31.

The light blocking portion 35 is formed, for example, from part of a black matrix layer. It is to be noted that the light blocking portion 35 may be formed such that a region for the light blocking portion 35 is added newly to the shape in plan of a general black matrix layer or part of the shape in plan of a general black matrix layer may be utilized as the light blocking portion 35.

Figure 2:
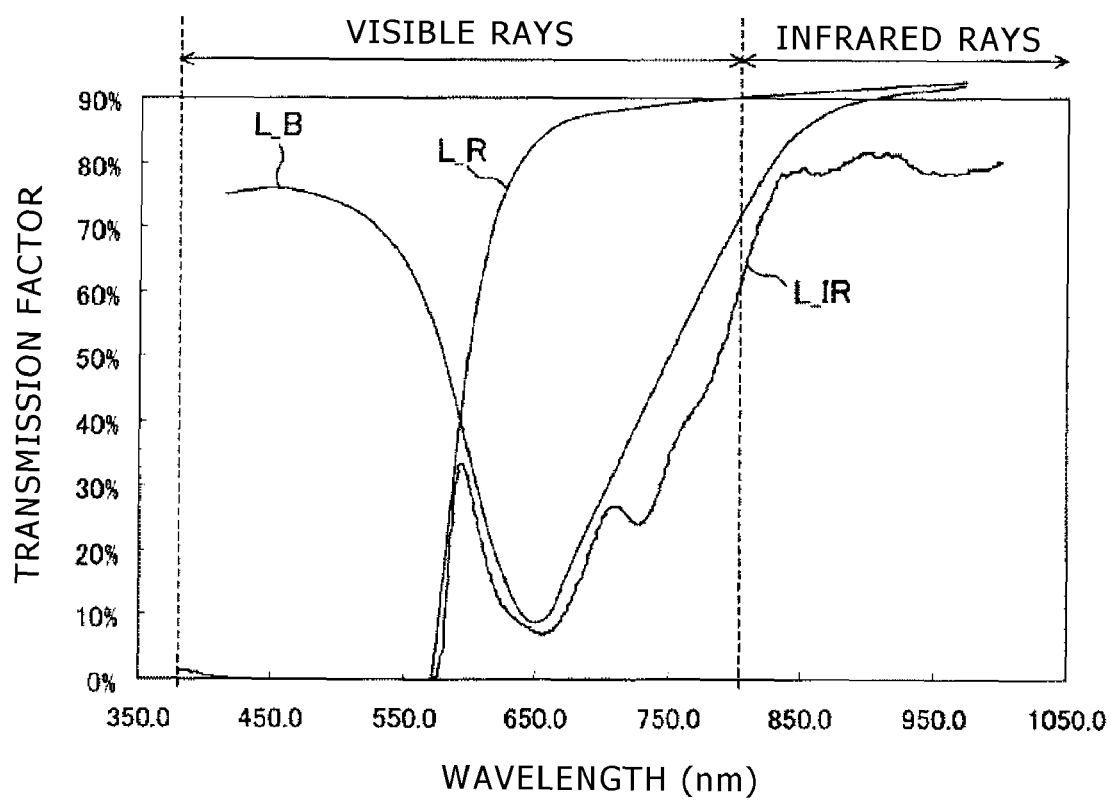
FIG. 2 is a view illustrating an action of an IR filter of the liquid crystal display apparatus of FIG. 1.

FIG. 2 is a view illustrating an action of the IR filter 33. In particular, FIG. 2 is a view illustrating spectral characteristics of the color filters 31R and 31B and the IR filter 33, and the axis of abscissa indicates the wavelength of light and the axis of ordinate indicates the transmission factor. Solid lines L_B, L_R and L_IR indicate spectral characteristics of the color filters 31B and 31R and the IR filter 33. It is to be noted that the spectral characteristics of the color filters 31B and 31R are illustrated in outline.

As indicated by the solid lines L_B and L_R, each of the color filters 31 exhibits a higher transmission factor in a wavelength region corresponding to light of each color in the frequency region of visible rays. In other words, each color filter 31 has a low transmission factor in a region of light of any color which does not correspond to the color filter 31 in the frequency region of visible rays.

Further, each color filter 31 has a high transmission factor also in the wavelength region of infrared rays. This is reported, for example, in the Abstract Collection for the Forum of the Japanese Liquid Crystal Society No. 1999, pp. 256 to 257. It is to be noted that the Commission International de l'Eclairrage prescribes that the boundary in wavelength between ultraviolet rays and visible rays is 360 nm to 400 nm and the boundary in wavelength between visible rays and infrared rays is 760 nm to 830 nm.

On the other hand, as indicated by the solid line L_IR, since the IR filter 33 is a laminate of the color filters 31R and 31B, the transmission factor thereof is roughly equal to the product of the transmission factors of the color filters 31R and 31B. Accordingly, the IR filter 33 exhibits a spectral characteristic that the transmission factor is low in the wavelength region of visible rays, but the transmission factor is high in the wavelength region of infrared rays.

An action of the liquid crystal display apparatus 1 having the configuration described above in detection of light incident from the screen is such as described below. If light including visible rays and invisible rays (including infrared rays) is introduced into the detection region 41b from the screen side (upper side of the plane of FIG. 1), then most part of the visible rays is absorbed by the IR filter 33 while most part of the infrared rays is transmitted through the IR filter 33. Then, the infrared rays passing through the IR filter 33 are received by the main sensor 19 and converted into an electric signal.

From within the light incident to the detection region 41b, that light which is introduced to the light blocking portion 35 is blocked by the light blocking portion 35. Accordingly, the noise removing sensor 21 receives light incident from the screen side and light from the backlight 3 reflected in the display panel 5 within a surrounding region (display region 41a and so forth) and outputs an electric signal corresponding to the amount of received light. The electric signal includes also an electric signal generated by heat and so forth. And, a control section 45 formed from an IC or the like uses the electric signal of the noise removing sensor 21 or a value obtained by multiplying the electric signal by a predetermined coefficient and/or adding the predetermined coefficient to the electric signal as a correction amount. Then, the correction amount is subtracted from the electric signal (voltage value or the like) of the main sensor 19 to remove noise from the electric signal of the main sensor 19.

The infrared rays to be incident from the screen may be those generated from a detection object or those reflected by the detection object, and the detection of the infrared rays by the main sensor 19 may be utilized to a suitable application. For example, if the backlight 3 is configured such that it can emit infrared rays simultaneously or alternately with visible rays and the infrared rays are reflected by a finger of a user or a touch pen positioned proximately to and/or contacting with the screen and then detected by the main sensor 19, then a display apparatus of the touch panel type is formed from the liquid crystal display apparatus 1.

A fabrication method of the liquid crystal display apparatus 1 includes an array step of forming the array substrate 7 and the CF substrate 9 by photolithography or the like, a cell step of assembling the array substrate 7 and the CF substrate 9 in an opposing relationship to each other and filling the liquid crystal 11, and a module step of attaching the assembly to an electronic circuit of a driving system or the like. It is to be noted that, at the cell step, the array substrate 7 and the CF substrate 9 are fixed to each other such that the main sensor 19 provided on the array substrate 7 is positioned behind the IR filter 33 provided on the CF substrate 9.

Figure 3:
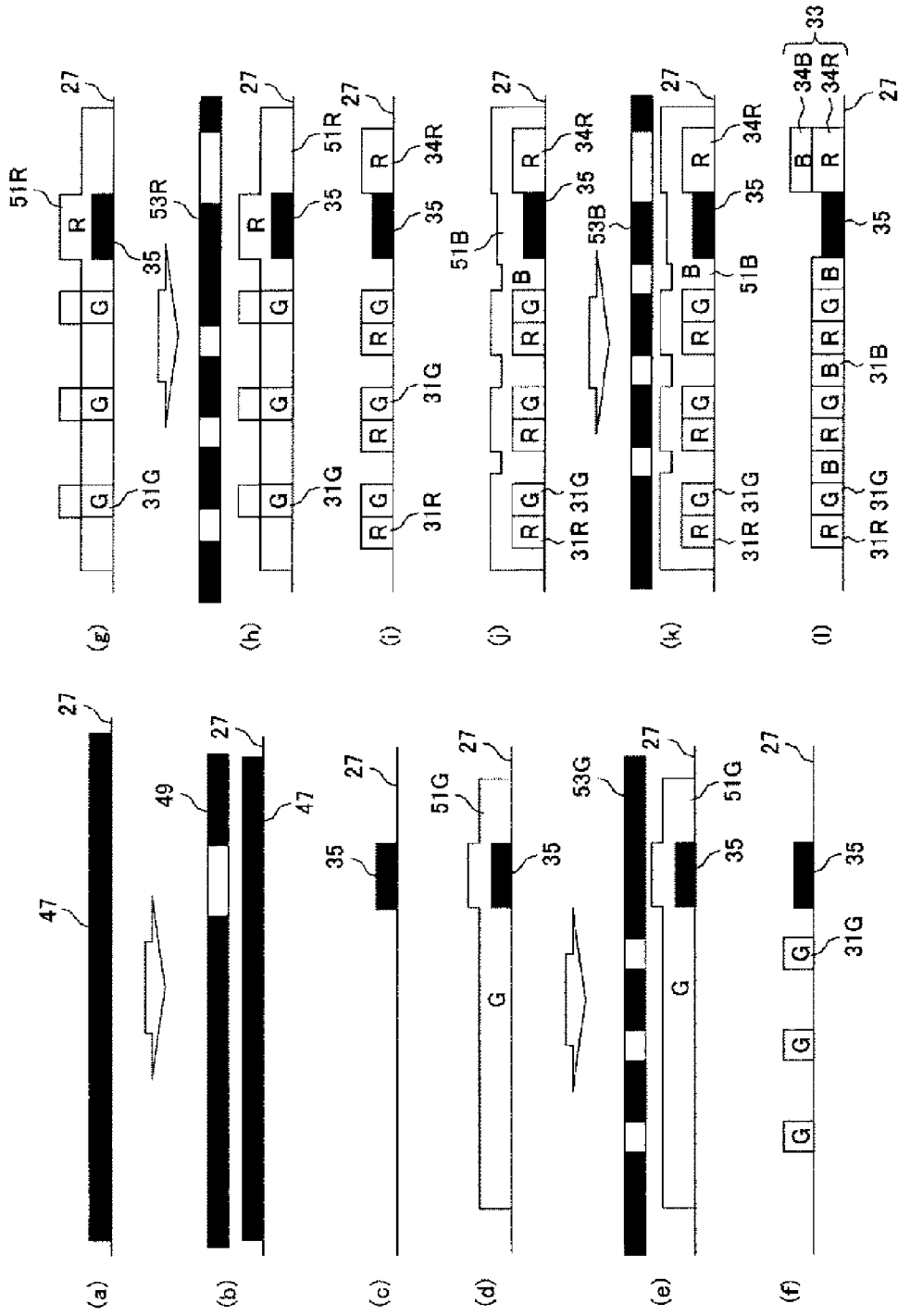
FIG. 3 is schematic views illustrating a formation method of a CF substrate of the liquid crystal display apparatus of FIG. 1.

(a) of FIG. 3 to (l) of FIG. 3 are schematic views illustrating a formation method of the CF substrate 9.

The CF substrate 9 is formed, for example, by photolithography. It is to be noted that, although the photolithography may be of the positive type or of the negative type, the following description is given taking the photolithography of the negative type as an example.

First, to the emergence side glass substrate 27 resist 47 from which the light blocking portion 35 (black matrix layer) is to be formed is applied to the emergence side glass substrate 27 as shown in (a) of FIG. 3. Then, the resist 47 is exposed to light through a photomask 49 ((b) of FIG. 3). Thereafter, the resist 47 is developed to form the light blocking portion 35 ((c) of FIG. 3).

In (d) of FIG. 3, resist 51G from which the color filter 31G is to be formed is applied to the emergence side glass substrate 27. Then, the resist 51G is exposed to light through a photomask 53G ((e) of FIG. 3), and thereafter, the resist 51G is developed to form the color filter 31G ((f) of FIG. 3).

In (g) of FIG. 3, resist 51R from which the color filter 31R and the filter composition layer 34R are to be formed is applied to the emergence side glass substrate 27. Then, the resist 51R is exposed to light through a photomask 53R ((h) of FIG. 3), and thereafter, the resist 51R is developed to form the color filter 31R and the filter composition layer 34R ((i) of FIG. 3).

In (j) of FIG. 3, resist 51B from which the color filter 31B and the filter composition layer 34B are to be formed is applied to the emergence side glass substrate 27. Then, the resist 51B is exposed to light through a photomask 53B ((k) of FIG. 3) and then is developed to form the color filter 31B and the filter composition layer 34B ((l) of FIG. 3).

As shown in (e) of FIG. 3, (h) of FIG. 3 and (k) of FIG. 3, the photomasks 53G, 53R and 53B are formed in different patterns so that the color filters 31 may not overlap with each other at arrangement positions (display region 41a) of the color filters 31.

Meanwhile, at the arrangement position (detection region 41b) of the IR filter 33, since no opening is formed in the photomask 53G, the resist 51G does not remain, but since openings (patterns) same as each other are formed in the photomasks 53R and 53B, the filter composition layer 34B is laminated on the filter composition layer 34R. In other words, the IR filter 33 composed of the filter composition layer 34B and the filter composition layer 34R is formed.

According to the first embodiment described above, the liquid crystal display apparatus 1 which can detect light incident from the screen is configured such that it includes the color filter substrate 9 which in turn includes the plurality of color filters 31 for different colors for passing light for displaying an image on the screen therethrough and the IR filter 33 provided in a region different from the arrangement regions of the color filters 31 for passing light incident from the screen therethrough, and the main sensor 19 provided on the back side of the IR filter 33 for detecting light incident from the screen and passing through the IR filter 33, the plural color filters 31 for the different colors having spectral characteristics that the transmission factors thereof are higher in particular wavelength regions different from each other among the color filters 31 within the wavelength region of visible rays, the color filters 31 for the plural colors further having spectral characteristics that the transmission factors thereof are higher in wavelength regions of invisible rays, the IR filter 33 having a laminate of filter materials same as filter materials from which the color filters 31 are formed. Therefore, the IR filter 33 is formed from the same materials as those of the color filters 31, and the configuration is simplified. As a result, also reduction of the material cost and simplification of the fabrication procedure can be anticipated.

Figure 4:
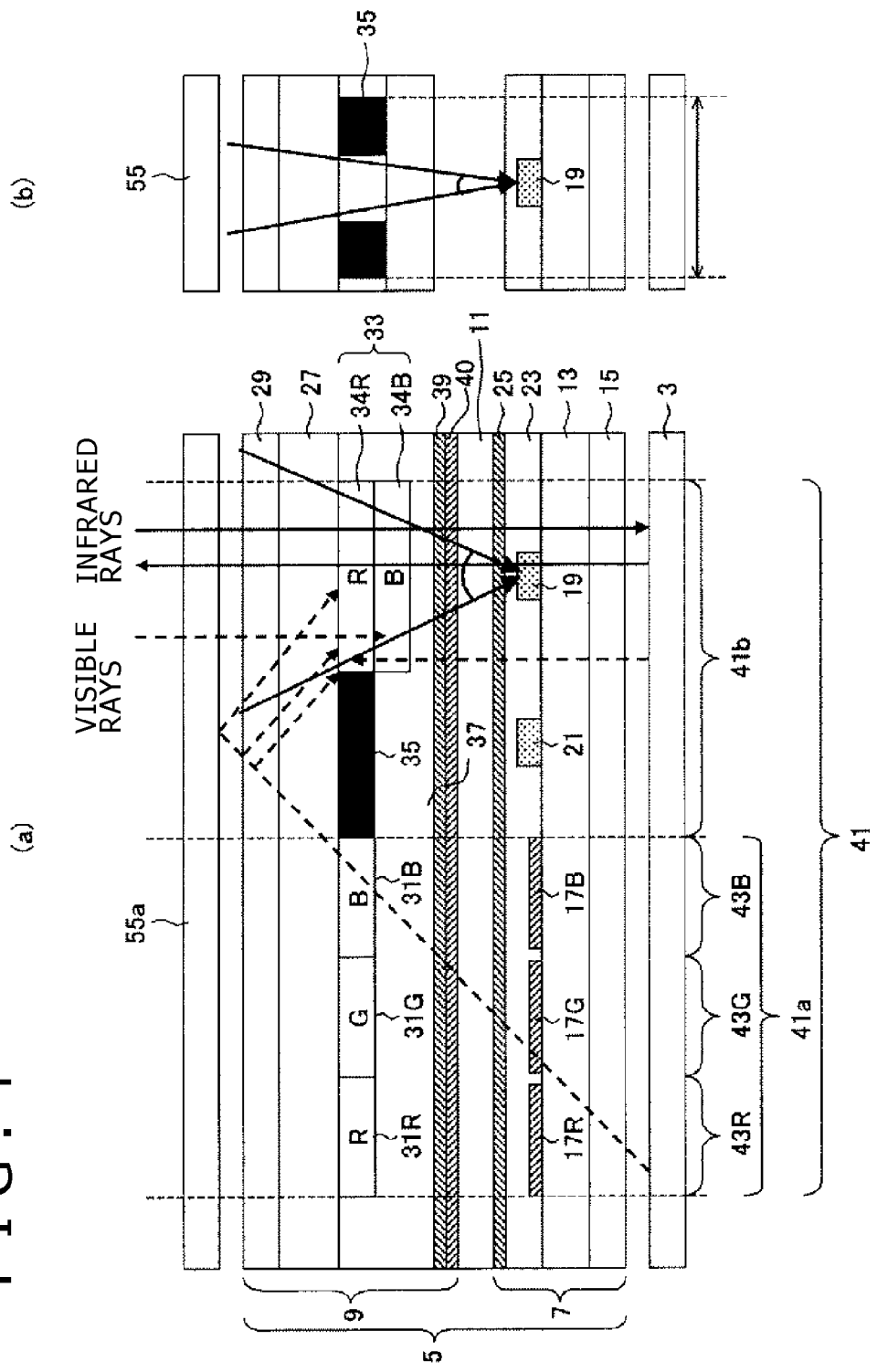
FIG. 4 is views illustrating an effect of the liquid crystal display apparatus of FIG. 1.

(a) of FIG. 4 and (b) of FIG. 4 are views illustrating an effect of the liquid crystal display apparatus 1. In the figures, a broken line arrow mark indicates visible rays, and a solid line arrow mark indicates infrared rays.

As shown in (a) of FIG. 4, the IR filter 33 can block visible rays directed from the backlight 3 to the screen 55a. Accordingly, deterioration of the display quality by light leakage from the proximity of the main sensor 19 can be suppressed. Further, since the IR filter 33 blocks visible rays of environmental light reflected by the main sensor 19 (light to be introduced from the outside of the liquid crystal display apparatus 1 to the screen 55a), deterioration of the display quality of the main sensor 19 by reflection of environmental light can be suppressed.

As shown (b) of FIG. 4, in order to suppress light leakage in the proximity of the main sensor 19, conventionally the opening forwardly of the main sensor 19 is formed small in the light blocking portion 35, and infrared rays can be received only within a small angle. However, since light leakage can be suppressed by the IR filter 33 as described above, infrared rays can be received over a great angle as seen in (a) of FIG. 4.

Further, where the opening forwardly of the main sensor 19 is small as shown in (b) of FIG. 4, if the accuracy in positioning of the array substrate and the CF substrate in the direction of the plane drops, then also the amount of light incident to the main sensor 19 disperses among products and dispersion occurs in the quality. However, also such possibility as just described is reduced.

As shown (a) of FIG. 4, the possibility that visible rays emitted from the backlight 3 may be reflected by the surface of the display panel 5 or the surface of the protective cover 55 and introduced as noise into the main sensor 19 is reduced by the IR filter 33.

The number of types of the plural color filters 31 for different colors is three or more, and the IR filter 33 only has filter materials same as the filter materials of the two types of the color filters 31R and 31B. Therefore, such a situation that a large number of filter materials are laminated to make the IR filter 33 thick is suppressed. As a result, for example, reduction of the thickness of the display panel 5 can be achieved, and enhancement of the picture quality by flattening of the emergence side orientation film 40 is achieved.

Since the color filter substrate 9 has the light blocking portion 35 and the noise removing sensor 21 which can detect light is provided behind the light blocking portion 35 and besides the control section 45 which subtracts a correction value based on a detection value of the noise removing sensor 21 from a detection value of the main sensor 19 is provided, the accuracy in detection is enhanced.

The fabrication method of the liquid crystal display apparatus 1 has the step of forming a layer of resist 51R which has a higher transmission factor of light within a wavelength region corresponding to red in a wavelength region of visible rays and a wavelength region of infrared rays ((g) of FIG. 3 to (i) of FIG. 3), a step of forming a layer of resist 51B which has a higher transmission factor of light within a wavelength region corresponding to blue in the wavelength region of visible rays and the wavelength region of infrared rays such that the layer of the resist 51B overlaps at part thereof with the layer of the resist 51R but does not overlap at the other part thereof with the layer of the resist 51R ((j) of FIG. 3 to (l) of FIG. 3), and a step (array step) of arranging the main sensor 19, which can detect light, behind the location at which the layer of the resist 51R and the layer of the resist 51B overlap with each other. Therefore, the IR filter 33 can be formed simultaneously with the formation of the color filters 31. In other words, increase of a fabrication step by provision of the IR filter 33 does not occur, and the fabrication cost is suppressed.

In the embodiment described above, the liquid crystal display apparatus 1 is an example of the display apparatus in the present invention; the IR filter 33 is an example of the detection filter in the present invention; the main sensor 19 is an example of the optical sensor in the present invention; the wavelength region of visible rays is an example of the first wavelength region in the present invention; the wavelength region of infrared rays or invisible rays is an example of the second wavelength region in the present invention; the wavelength regions corresponding to red and blue are an example of the particular wavelength region, third wavelength region or fourth wavelength region; the resists 51 are an example of the filter materials in the present invention; the control section 45 is an example of the mathematical operation section in the present invention; the step of (g) of FIG. 3 to (i) of FIG. 3 is an example of the first step in the present invention; the step of (j) of FIG. 3 to (l) of FIG. 3 is an example of the second step in the present invention; and the array step is an example of the third step in the present invention.

Second Embodiment

Figure 5:
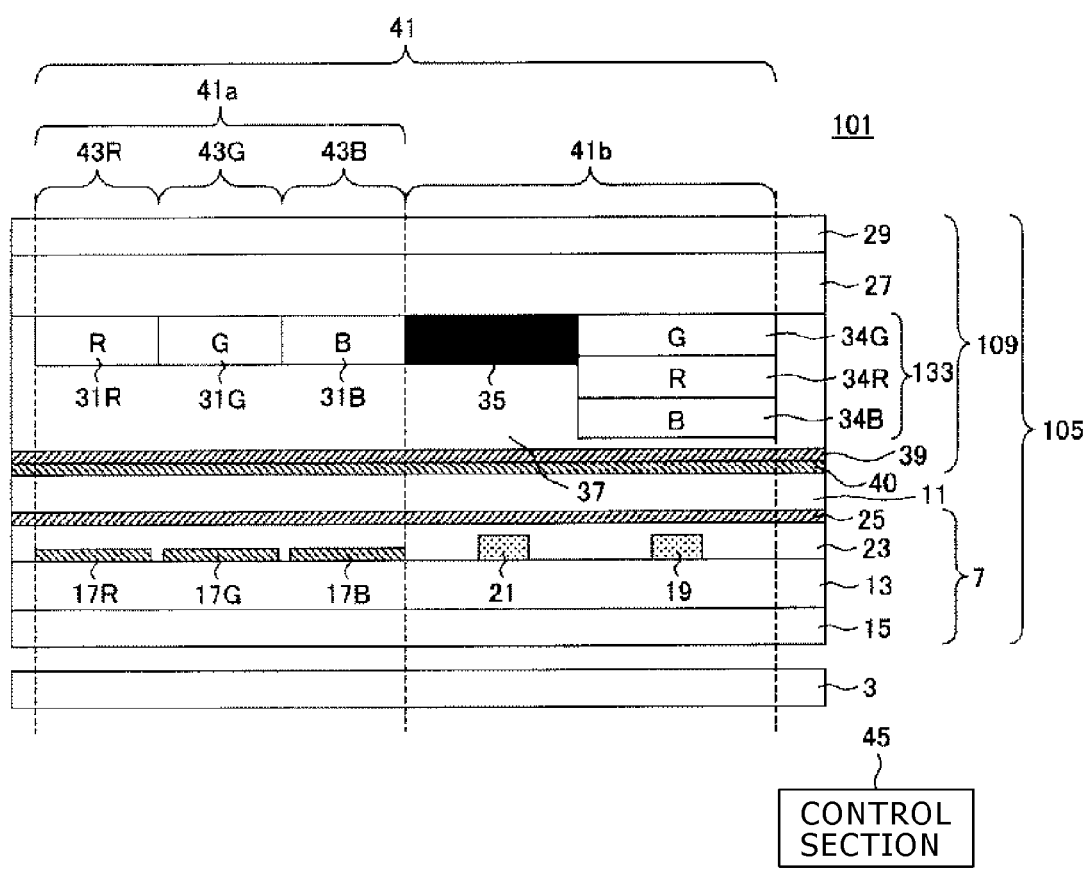
FIG. 5 is a sectional view schematically showing a general configuration of a liquid crystal display apparatus according to a second embodiment of the present invention.

FIG. 5 is a sectional view schematically showing a general configuration of a liquid crystal display apparatus 101 of a second embodiment.

The liquid crystal display apparatus 101 of the second embodiment is different in the configuration of an IR filter 133 in comparison with the liquid crystal display apparatus 1 of the first embodiment. In particular, while the IR filter 33 in the first embodiment is formed from the two kinds of filter composition layers 34R and 34B, the IR filter 133 in the second embodiment is formed from filter composition layers 34R, 34G and 34B corresponding to all types (three colors) of the color filters 31.

It is to be noted that, since the thickness of the filter composition layers 34 is equal to the thickness of the color filters 31, the thickness of the IR filter 133 in the second embodiment is 3/2 times the thickness of the IR filter 33 in the first embodiment, and a CF substrate 109 and a display panel 105 are thicker then the CF substrate 9 and the display panel 5 in the first embodiment by an increasing amount of the thickness of the IR filter 133 from the IR filter 33.

Figure 6:
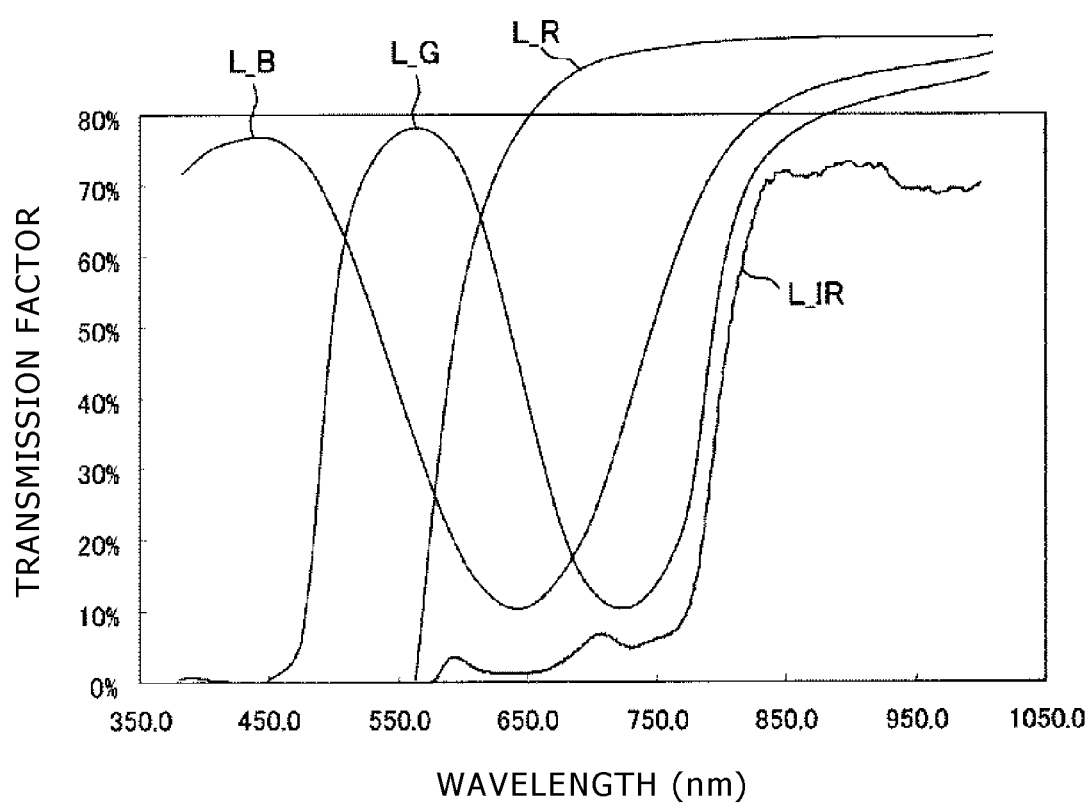
FIG. 6 is a view illustrating an action of an IR filter of the liquid crystal display apparatus of FIG. 5.

FIG. 6 is a view illustrating an action of the IR filter 133. In particular, FIG. 6 is a view illustrating spectral characteristics of the color filters 31R, 31G and 31B and the IR filter 133, and the axis of abscissa indicates the wavelength and the axis of ordinate indicates the transmission factor. Solid lines L_B, L_G, L_R and L_IR indicate the spectral characteristics of the color filters 31B, 31G and 31R and the IR filter 133, respectively. It is to be noted that the spectral characteristics of the color filters 31B, 31G and 31R illustrated are general spectral characteristics.

Also the color filter 31G has a higher transmission factor within a wavelength region of a color (green) corresponding to the color filter 31G itself within the frequency region of visible rays similarly to the color filters 31B and 31R described hereinabove with reference to FIG. 2 as well as within a wavelength region of infrared rays. And, the transmission factor of the IR filter 133 is the product of the transmission factors of the color filters 31R, 31G and 31B. Accordingly, the IR filter 133 in the second embodiment indicates, in comparison with the IR filter 33 in the first embodiment, a lower transmission factor in the frequency region of visible rays by an amount provided by the multiplication of the transmission factor of the color filter 31G, and indicates a more preferable spectral characteristic as an IR filter.

Figure 7:
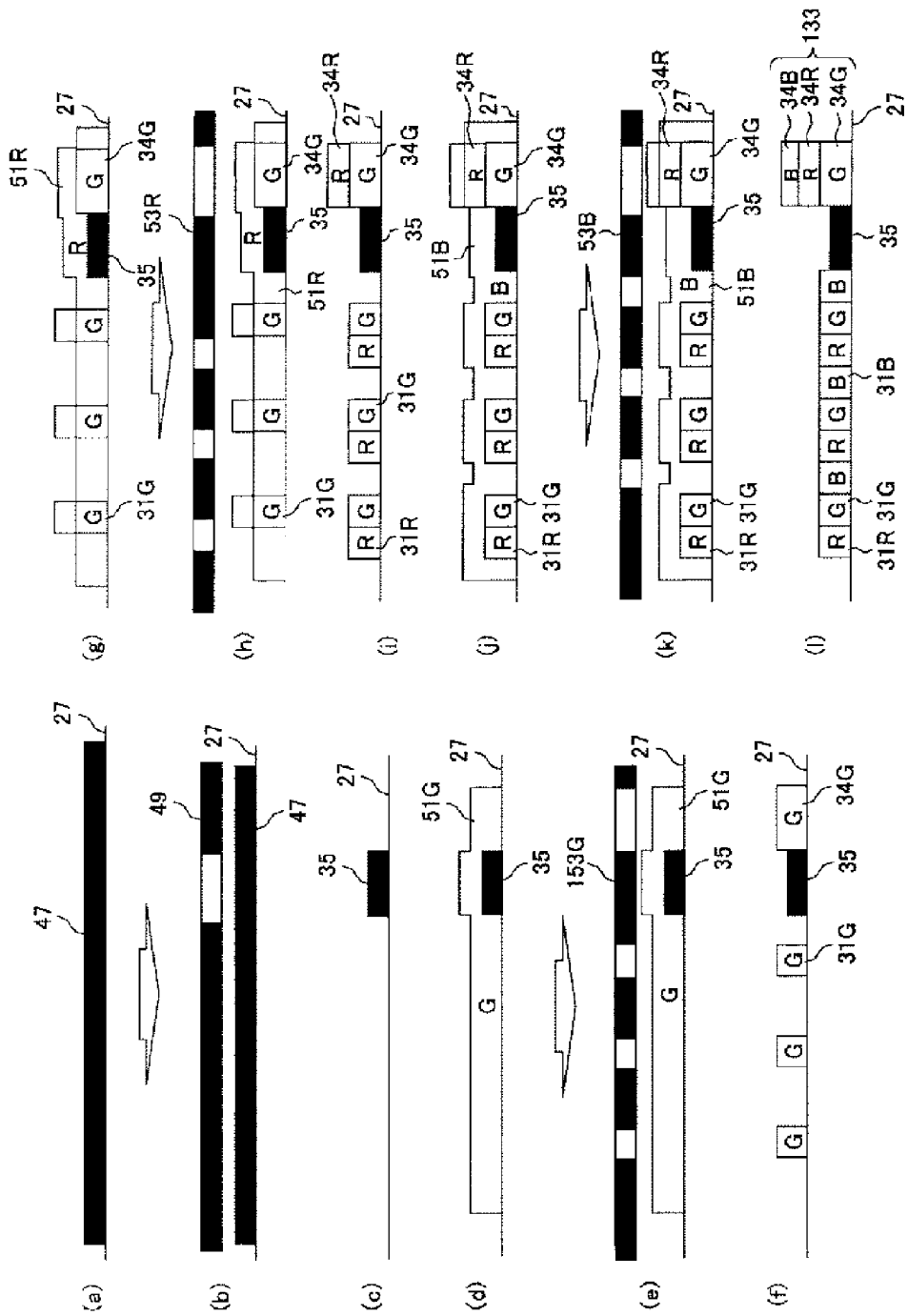
FIG. 7 is schematic views illustrating a formation method of a CF substrate of the liquid crystal display apparatus of FIG. 5.

(a) of FIG. 7 to (l) of FIG. 7 are schematic views illustrating a formation method of the CF substrate 109.

(a) of FIG. 7 to (l) of FIG. 7 correspond to (a) of FIG. 3 to (l) of FIG. 3 of the first embodiment. And, the formation method of the CF substrate 109 is different in comparison with the formation method of the CF substrate 9 illustrated in FIG. 3 in that the photomask 53G in (e) of FIG. 3 is replaced by a photomask 153G in the (e) of FIG. 7 corresponding to (e) of FIG. 3.

The photomask 153G has an opening formed at a position thereof at which the IR filter 133 is formed similarly to the photomasks 53R and 53B. As a result, in (f) of FIG. 7 to (l) of FIG. 7 which illustrate later steps, a filter composition layer 34G which is not formed in the first embodiment is formed, and the filter composition layers 34R and 34B are laminated on the filter composition layer 34G.

With the embodiment described above, similar effects to those of the first embodiment are achieved. Further, since the IR filter 133 has a laminate of filter materials from which all types of the color filters 31 are formed, the transmission factor for visible rays is lower than that of the IR filter 33 in the first embodiment, and a spectral characteristic appropriate for an IR filter is exhibited.

(Array of Sub Pixels and So Forth)

In the embodiments described above the color filters 31 and the IR filter 33 (133) are arrayed in a suitable array such as a stripe array, a mosaic array or a delta array. In the following, examples of an array of the color filters 31 and the IR filter 33 are described. It is to be noted that, in the drawings referred to herein, the character S is sometimes added to the arrangement position of an IR filter. Further, the light blocking portion 35 has a very small area in comparison with the color filters 31 or the IR filter 33 and/or the light blocking portion 35 is arranged in a laminated relationship on part of the color filters 31 and/or the IR filter 33, and therefore, the light blocking portion 35 is not shown.

Figure 8:
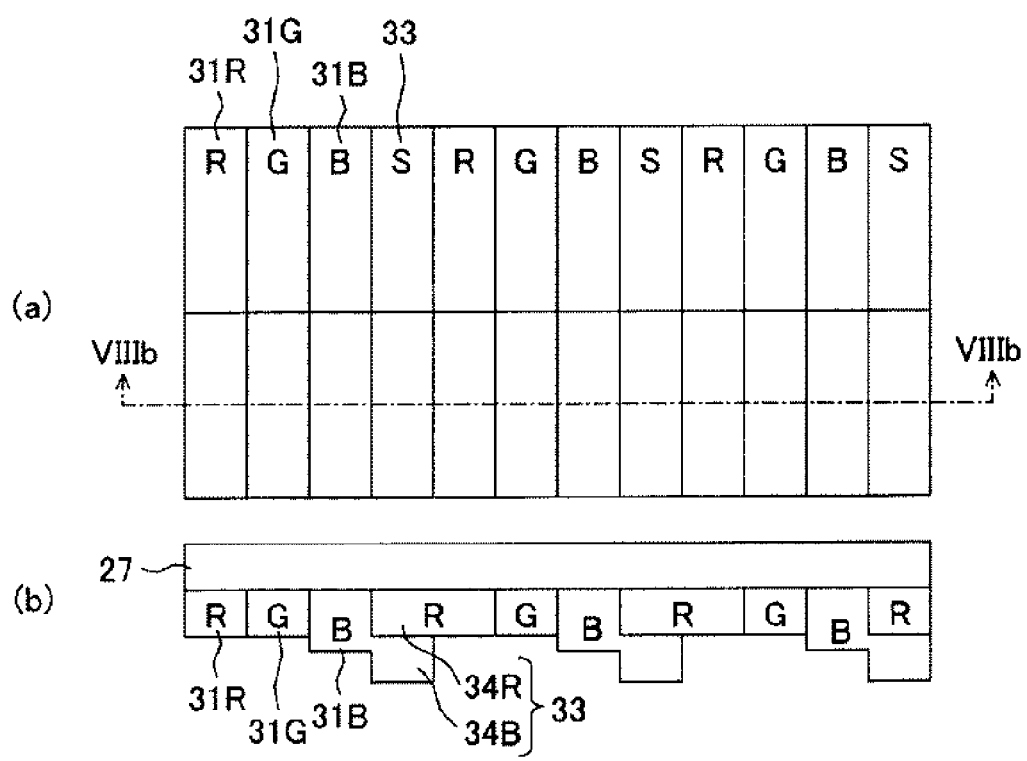
FIG. 8 is views illustrating an example of a pixel array of the liquid crystal display apparatus of FIG. 1.

FIG. 8 shows an example of a stripe array, and (a) of FIG. 8 is a plan view and (b) of FIG. 8 is a sectional view taken along line VIIIb-VIIIb of (a) of FIG. 8.

The color filters 31 and the IR filter 33 are arrayed repetitively in a fixed order in one direction (in the leftward and rightward direction of the plane of (a) of FIG. 8) and the same color filters 31 or IR filter 33 are arrayed successively in a direction perpendicular to the one direction (in the upward and downward direction of the plane of (a) of FIG. 8.

Each IR filter 33 is sandwiched by color filters 31 made of the same materials as the materials from which the IR filter 33 is made (in the example of FIG. 8, by color filters 31R and 31B), and sides thereof are contiguous to sides of the color filters 31. Accordingly, the filter composition layer 34R and color filter 31R and the filter composition layer 34B and color filter 31B are continuous (or contiguous) to each other as viewed in plan. As a result, for example, even if pixels are refined, the accuracy of the patterns can be suppressed from deterioration. Further, for example, exposure to light of portions from which the filter composition layers 34 and the color filter 31R are to be formed can be carried out through one opening formed in the photomask 53R ((h) of FIG. 3), and the patterns of the photomask 53R can be simplified.

Figure 9:
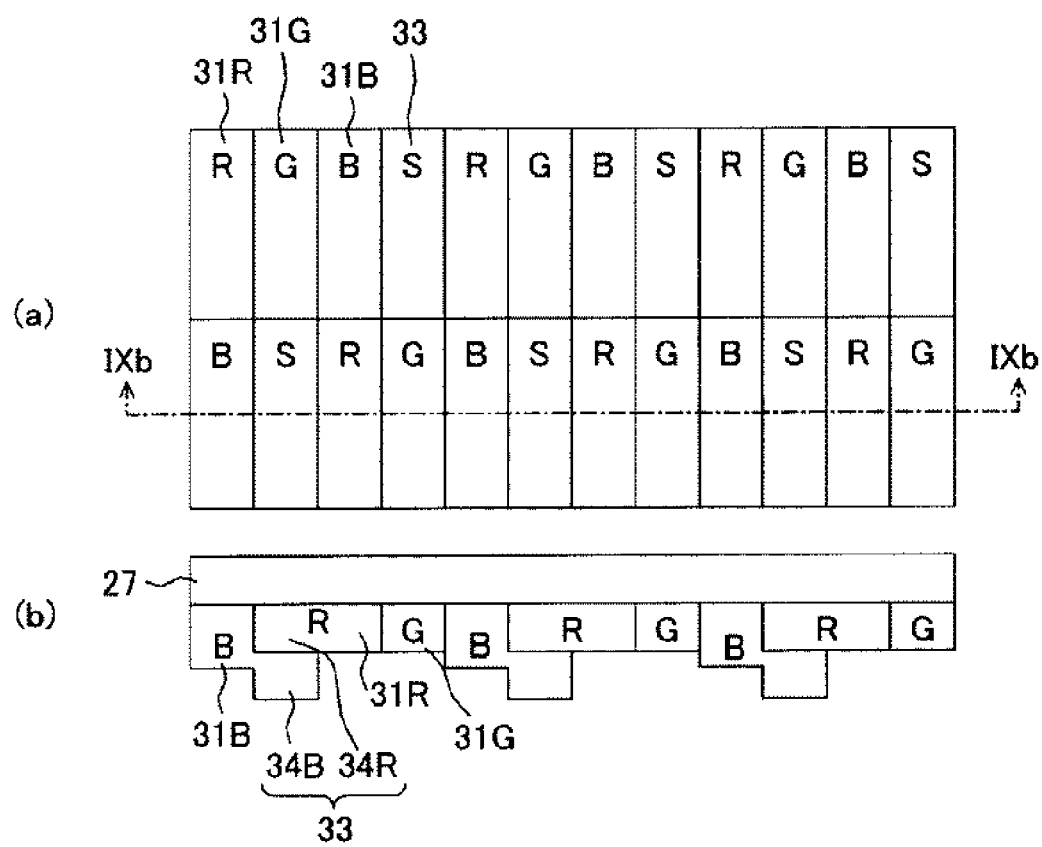
FIG. 9 is views illustrating another example of the pixel array of the liquid crystal display apparatus of FIG. 1.

FIG. 9 shows an example of a delta array, and (a) of FIG. 9 is a plan view and (b) of FIG. 9 is a sectional view taken along line IXb-IXb of (a) of FIG. 9).

The color filters 31 and the IR filter 33 are arrayed repetitively in a fixed order in one direction (in the leftward and rightward direction of the plane of (a) of FIG. 9). Further, a plurality of arrays (rows) in the one direction are displaced by two columns in the one direction as the row is displaced by every one row in a direction perpendicular to the one direction (in the upward and downward direction of the plane of (a) of FIG. 9).

Also in this example, each IR filter 33 is sandwiched between color filters 31 made of materials same as the materials from which the IR filter 33 is formed (in the example of FIG. 9, between color filters 31R and 31B) and sides thereof are contiguous to sides of the color filters 31R and 31B. Accordingly, the example exhibits an effect of suppression of deterioration of the accuracy of patterns and so forth similarly to the example of FIG. 8.

Figure 10:
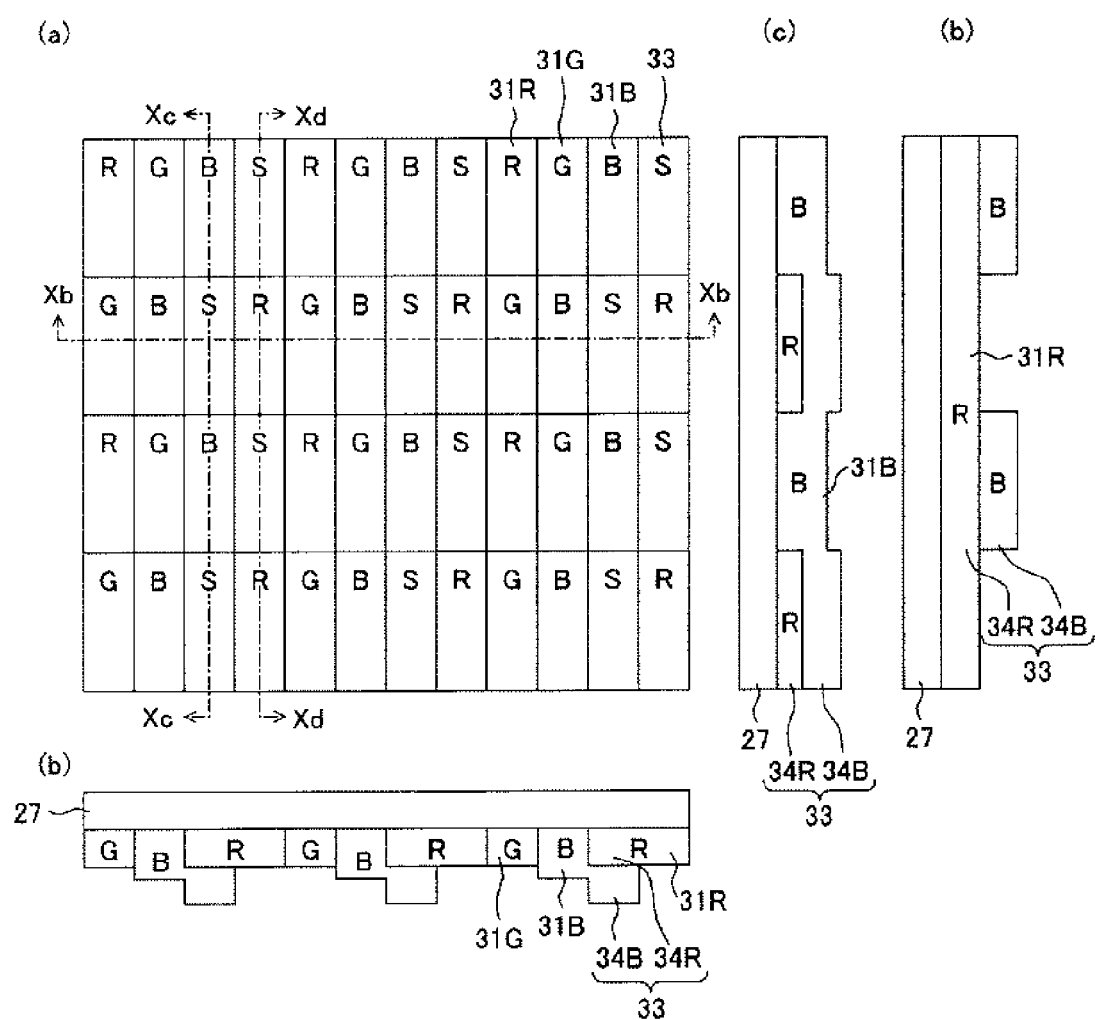
FIG. 10 is views illustrating a further example of the pixel array of the liquid crystal display apparatus of FIG. 1.

FIG. 10 shows another example of the delta array, and (a) of FIG. 10 is a plan view, (b) of FIG. 10 is a sectional view taken along line Xb-Xb of (a) of FIG. 10, (c) of FIG. 10 is a sectional view taken along line Xc-Xc of (a) of FIG. 10, and (d) of FIG. 10 is a sectional view taken along line Xd-Xd of (a) of FIG. 10.

The color filters 31 and the IR filter 33 are arrayed repetitively in a fixed order in one direction (in the leftward and rightward direction of the plane of (a) of FIG. 9). Further, a plurality of arrays (rows) in the one direction are displaced by two columns in the one direction as the row is displaced by every one row in a direction perpendicular to the one direction (in the upward and downward direction of the plane of (a) of FIG. 9).

Also in this example, each IR filter 33 is sandwiched between color filters 31 made of materials same as the materials from which the IR filter 33 is formed (in the example of FIG. 10, between color filters 31R and 31B) and sides thereof are contiguous to sides of the color filters 31R and 31B. Accordingly, the example exhibits an effect of suppression of deterioration of the accuracy of patterns and so forth similarly to the examples of FIGS. 8 and 9. Further, since the arrays (rows) are displaced alternately in the one direction (in the leftward and rightward direction of the plane of (a) of FIG. 9), the filter materials from which two color filters 31 (in the example of FIG. 10, 31B and 31R) are formed are continuous in the upward and downward direction of the plane of (c) of FIG. 10 and (d) of FIG. 10, as seen in (c) of FIG. 10 and (d) of FIG. 10, and reduction of deterioration of the accuracy of patterns and so forth are achieved further.

Figure 11:
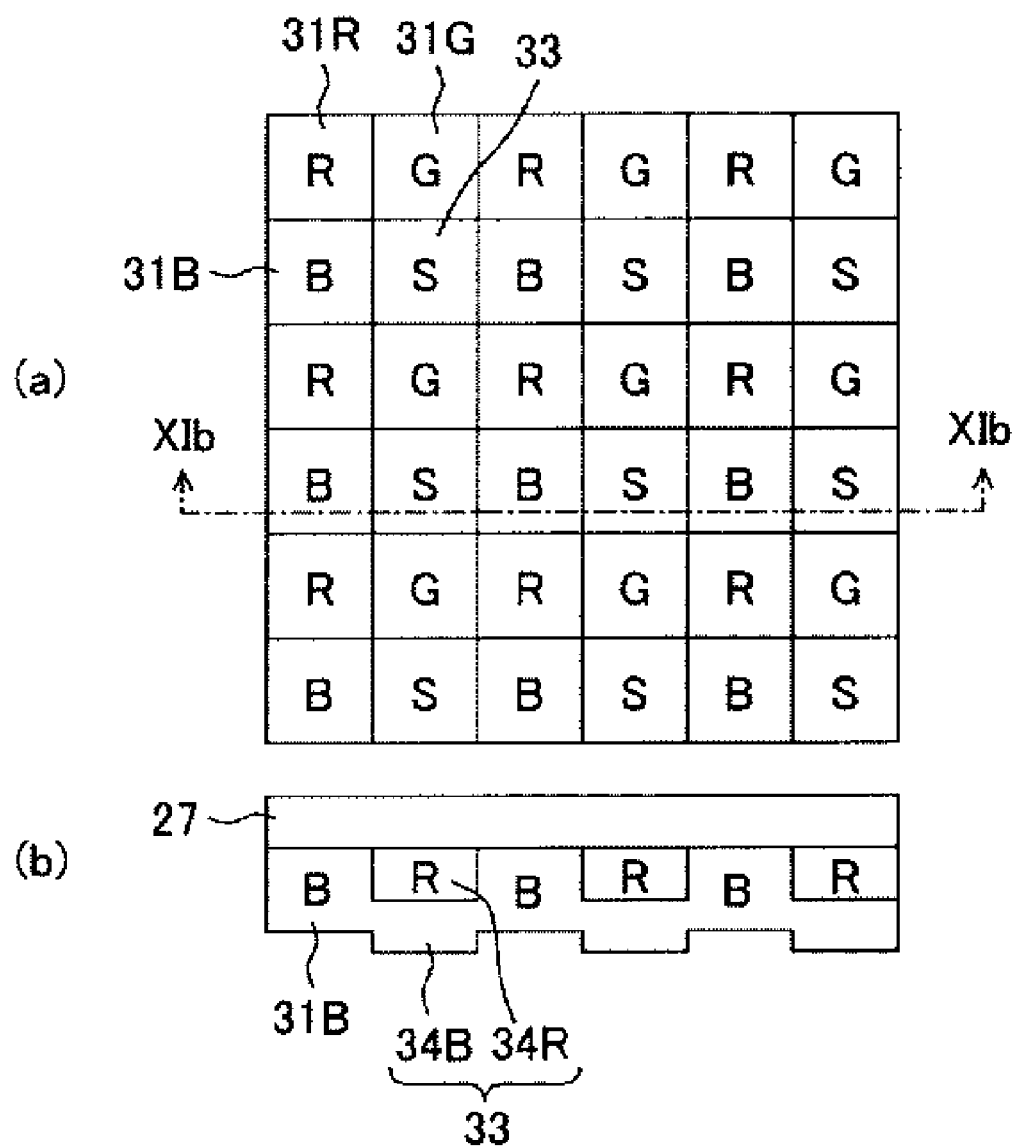
FIG. 11 is views illustrating a still further example of the pixel array of the liquid crystal display apparatus of FIG. 1.

FIG. 11 shows another example of the array, and (a) of FIG. 11 is a plan view and (b) of FIG. 11 is a sectional view taken along line XIb-XIb of (a) of FIG. 11.

The color filters 31 and the IR filter 33 are arrayed in a rectangular shape to form one pixel. And, such pixels are arrayed in rows and columns. A side of the IR filter 33 is contiguous to a side of a color filter 31 made of a material same as the material from which the IR filter 33 is formed (in the example of FIG. 11, the color filter 31B). Accordingly, similarly to the examples of FIGS. 8 to 10, an effect of suppression of deterioration of the accuracy of patterns and so forth are achieved further. Furthermore, as shown in (b) of FIG. 11, the filter materials from which one color filter 31 (31B in the example of FIG. 10) is formed are continuous in the leftward and rightward direction of the plane of (b) of FIG. 11, and reduction of deterioration of the accuracy of patterns and so forth are achieved further.

Figure 12:
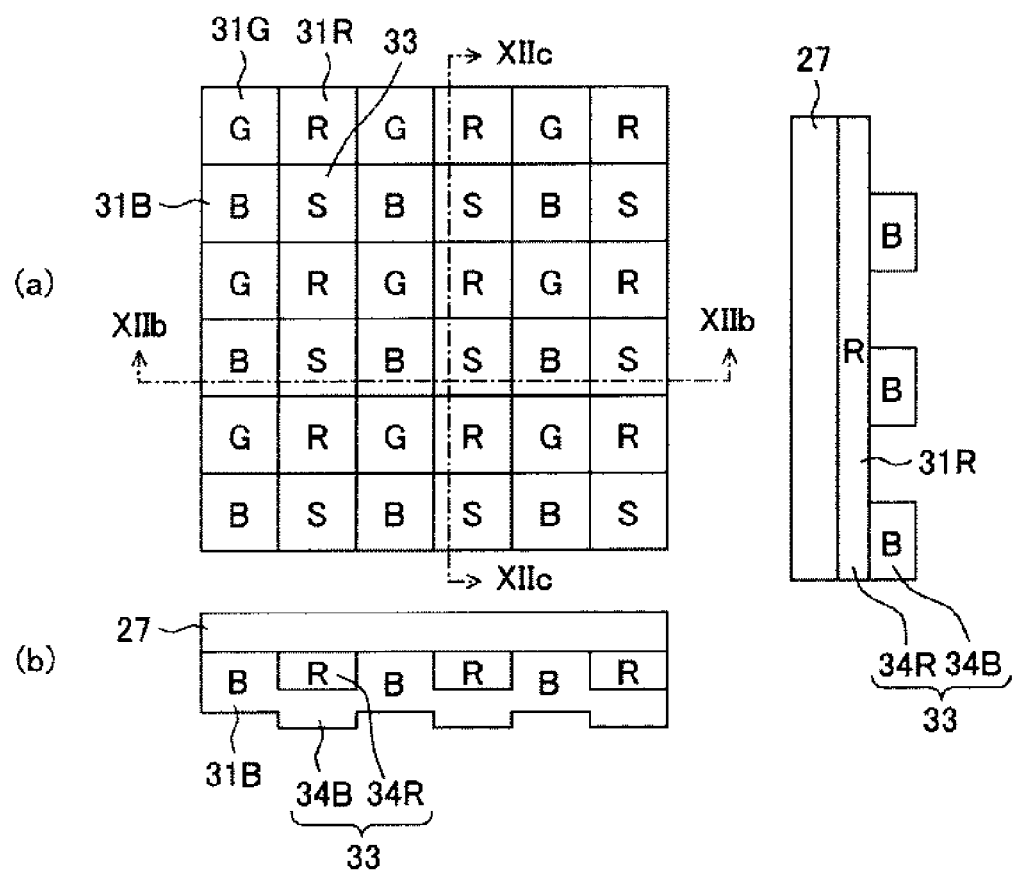
FIG. 12 is views illustrating a yet further example of the pixel array of the liquid crystal display apparatus of FIG. 1.

FIG. 12 shows a further example of the array, and (a) of FIG. 12 is a plan view, (b) of FIG. 12 is a sectional view taken along line XIIb-XIIb of (a) of FIG. 12, and (c) of FIG. 12 is a sectional view taken along line XIIc-XIIc of (a) of FIG. 12.

In the example of FIG. 12, the color filters 31 and the IR filter 33 are arrayed in a rectangular shape to form one pixel similarly to the example of FIG. 11. However, in the example of FIG. 12, sides of the IR filter 33 are contiguous to sides of two kinds of color filters 31 (in the example of FIG. 12, 31R and 31B) formed from filter materials from which the IR filter 33 is formed, and the number of color filters 31 formed from the same materials and having contiguous sides is greater by one than that in the example of FIG. 11. Accordingly, suppression of deterioration of the accuracy of patterns and so forth are further anticipated than those in the example of FIG. 11.

Further, in the example of FIG. 12, the layer of one kind of a filter material (filter material of the color filter 31B) is formed long in a predetermined direction (in the leftward and rightward direction of the plane of (a) of FIG. 12) as viewed in plan and a plurality of such layers are arrayed in a direction perpendicular to the predetermined direction (in the upward and downward direction of the plane of (a) of FIG. 12). Further, a layer of another kind of a filter material (filter material of the color filter 31R) is formed long in the direction perpendicular to the predetermined direction, and a plurality of such layers are arrayed in the predetermined direction. Further, the color filters 31R and 31B are formed from portions which do not overlap with each other while the IR filter 33 is formed from portions which overlap with each other, and layers of two kinds of filter materials extend continuously long along the screen thereby to achieve further suppression of deterioration of the accuracy of patterns.

It is to be noted that, while, in the embodiment and the array examples described above, it is described that the number of kinds of the color filters 31 is three, the number of kinds of the color filters 31 may be two or four or more. Further, a subpixel 43W in which the color filters 31, IR filter, light blocking portion 35 and so forth are not provided and which corresponds to white may be provided.

Figure 13:
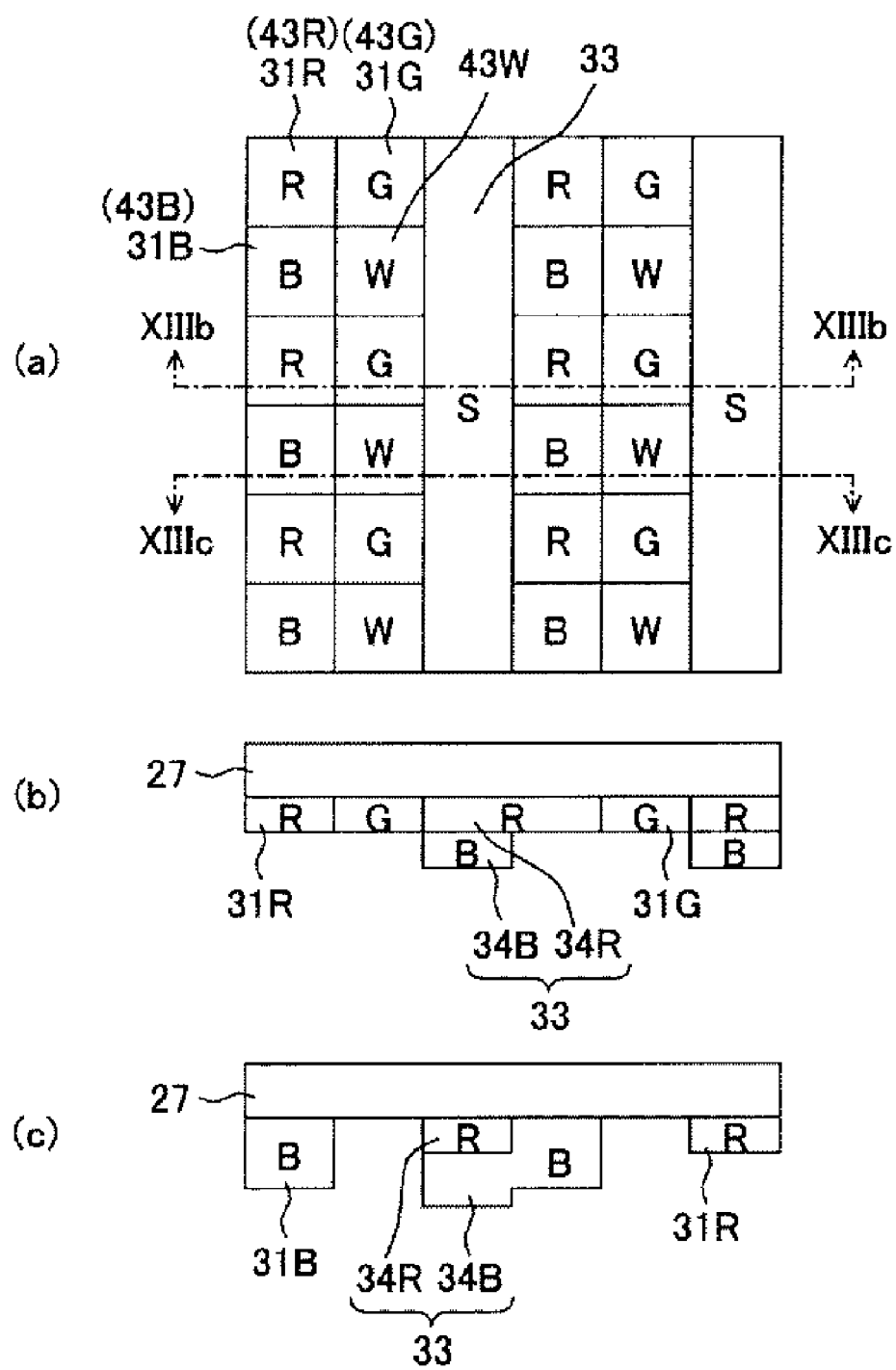
FIG. 13 is views illustrating an example of a pixel array of a liquid crystal display apparatus according to a modification of the present invention.

FIG. 13 shows an example of arrangement where a subpixel 43W corresponding to white is provided in addition to subpixels 43R, 43G and 43B, and (a) of FIG. 13 is a plan view, (b) of FIG. 13 is a sectional view taken along line XIIIb-XIIIb of (a) of FIG. 13, and (c) of FIG. 13 is a sectional view taken along line XIIIc-XIIIc of (a) of FIG. 13.

In this arrangement example, subpixels 43R, 43G, 43B and 43W are arranged in a rectangular shape, and the IR filter 33 is disposed such that sides thereof are contiguous to sides of two subpixels 43 to form one pixel. Such pixels are arrayed in rows and columns. The IR filter 33 is contiguous to color filters 31 formed from filter materials from which the IR filter 33 is formed (in the example of FIG. 13, 31R and 31B).

Also in this example, two kinds of the color filters 31 and the filter composition layers 34 of materials same as the materials of the color filters 31 are contiguous to each other, and effects similar to those of the preferred arrangement examples in a case wherein the three kinds of the subpixels 43 described hereinabove are provided are obtained.

The present invention is not limited to the embodiment described above but may be carried out in various modes.

The display apparatus of the present invention may be applied to all electronic apparatus. For example, the display apparatus of the present invention may be applied to a portable telephone set, a digital camera, a PDA, a notebook type personal computer, a game machine, a television set, a car navigation system and an ATM.

Further, the display apparatus of the present invention is not limited to a liquid crystal display apparatus but may be for example, an organic EL display apparatus. Further, where the display apparatus of the present invention is a liquid crystal display apparatus, it is not limited to that of the semi-transmission type or the transmission type but may be of the reflection type.

The number of sensors may not be a plural number but may be only one. Where a plurality of sensors are arranged in a distributed manner, they may be arranged two-dimensionally as in the embodiment or may be arranged one-dimensionally. Further, the array or the density of a plurality of sensors may be set suitably, and besides, the array or the density may vary locally. A plurality of sensors may not be provided for each pixel, but may be arranged in a distributed manner such that one sensor is provided commonly to a plural but small number of pixels such as, for example, two to five.

The light utilized for detection is not limited to invisible rays but may be visible rays. In other words, the first wavelength region may be set to a wavelength region which is part of the wavelength region of visible rays while the second wavelength region is set to a different wavelength region within the wavelength region of visible rays. Meanwhile, the invisible rays are not limited to infrared rays but may be, for example, ultraviolet rays. The wavelength regions of a plurality of filters of different colors which have a higher transmission factor within the first wavelength region (specific wavelength region, third wavelength region and fourth wavelength region, in the embodiment, wavelength regions corresponding to red, green and blue) may partly overlap with each other.

The color filters and the IR filters may be arranged at suitable positions and are not limited to those which are provided on a glass substrate disposed on the screen side from between two glass substrates opposing to each other or not limited to those which are provided on the rear face side of the glass substrate. For example, an IR filter or the like may be laminated on a sensor arranged on the screen side of the glass plate.

The formation method of the color filters or the IR filters is not limited to the photolithography technique. The formation method may be a printing method or an anode method. Anyway, by forming the IR filter from filter materials from which color filters are formed, reduction of the number of kinds of materials, simplification of the fabrication procedure and so forth are achieved.

The invention claimed is:

1. A display apparatus, comprising:
    color filters of different colors operable to pass light for displaying an image on a screen;
    a detection filter operable to pass light incident from the screen; and
    an optical sensor operable to detect light incident from the screen through said detection filter,
    wherein,
        at least two or more of said color filters have spectral characteristics with transmission factors that are higher in particular wavelength regions, the wavelength regions being different among the color filters within a first wavelength region, and the transmission factors being higher in a second wavelength region relative to the first wavelength region;
    said detection filter formed from a laminate of filter materials, the two or more color filters formed from the same filter materials as the detection filter.

2. The display apparatus according to claim 1, wherein said detection filter is provided in a region different from arrangement regions of said color filters on a color filter substrate.

3. The display apparatus according to claim 2, further comprising:
    a noise removing sensor capable of detecting light provided behind a light blocking portion on said filter substrate; and
    a mathematical operation section operable to subtract a correction value based on a detection value of said noise removing sensor from a detection value of said optical sensor.

4. The display apparatus according to claim 1, wherein
    the first wavelength region is a wavelength region of visible rays, and
    the second wavelength region is a wavelength region of invisible rays.

5. The display apparatus according to claim 1, wherein said detection filter has sides contiguous, as viewed in plan, to sides of the two or more color filters.

6. The display apparatus according to claim 1, wherein,
    a plurality of layers of the filter material of a first one of the colors are (i) formed in a first direction as viewed in plan and (ii) arrayed in a second direction perpendicular to the first direction,
    a plurality of layers of the filter material of a second one of colors are formed in the second direction as viewed in plan are arrayed in the first direction,
    said color filters are formed from portions of the filter material which do not overlap with each other, and
    said detection filter is formed from portions of the filter material which overlap with each other.

* * * * *